United States Patent [19]

Perry

[11] Patent Number: 4,598,268

[45] Date of Patent: Jul. 1, 1986

[54] DIGITAL SPAN CONVERSION CIRCUIT

[75] Inventor: Thomas J. Perry, Phoenix, Ariz.

[73] Assignee: GTE Automatic Electric Inc., Northlake, Ill.

[21] Appl. No.: 506,572

[22] Filed: Jun. 22, 1983

[51] Int. Cl.⁴ ............................................. H04L 25/06
[52] U.S. Cl. .............................. 340/347 DD; 375/76; 375/17
[58] Field of Search .................... 328/119; 370/63, 13, 370/16; 375/17, 76; 179/18 EE; 329/104; 340/347 DD

[56] References Cited

U.S. PATENT DOCUMENTS 2,700,696 1/1955 Barker .................................... 375/17
3,461,390 8/1969 Mack .................................... 328/119
4,413,335 11/1983 Clements ............................... 370/63

Primary Examiner—Charles D. Miller
Attorney, Agent, or Firm—Frank J. Bogacz; Peter Xiarhos

[57] ABSTRACT

In a telecommunications switching system, a thick film digital span conversion circuit is connected between a digital span and a switching network of the switching system. The circuit converts data, which is encoded for digital span use, to TTL logic coding for use by the switching network. The telecommunications switching system also provides for duplicated data transmission through the switching network. Duplicated conversion circuits are employed in an active/standby configuration under CPU control. The present circuit is relatively small in size and has minimal power consumption.

14 Claims, 6 Drawing Figures

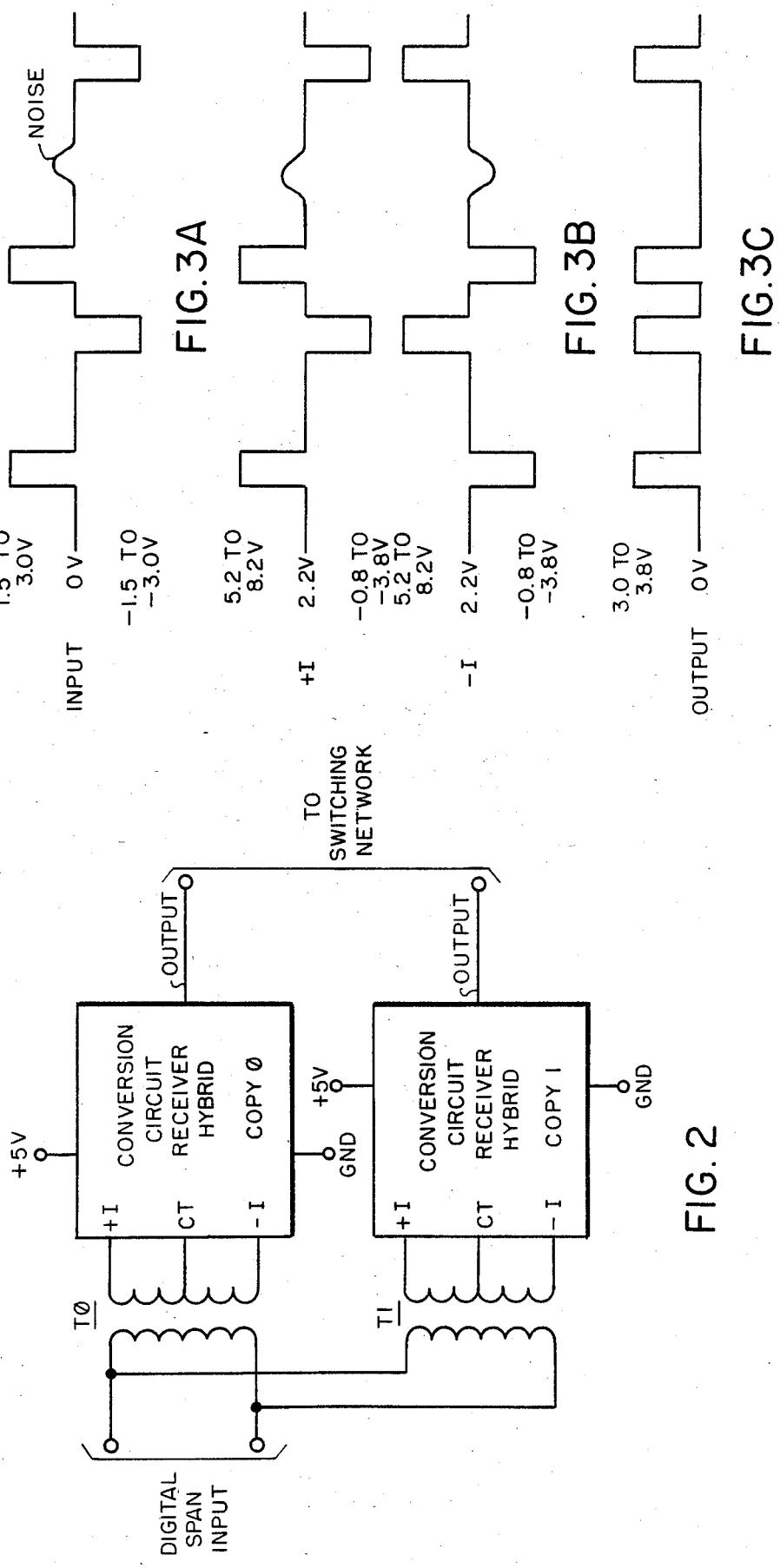

(54)

DIGITAL SPAN CONVERSION CIRCUIT

BACKGROUND OF THE INVENTION

The present invention pertains to digital span data reception and more particularly to a circuit for converting digital span encoded data to data levels compatible with a switching network of a switching system.

Available circuitry for converting digital span data to TTL logic levels commonly associated with modern switching networks, require high power consumption. This is due to the bi-polar nature of the signals being transmitted via digital spans and to the magnitude of the voltage levels of these signals. Such commonly available circuits are implemented using discrete components, thereby requiring considerable space in addition to the power consumption. These available circuits require several voltage levels for the conversion process.

In addition, these circuits are generally not configurable as duplex arrangement as required by public policy providing for practically no service interruptions over extended periods of time.

Accordingly, it is the object of the present invention to provide a single voltage level digital span data conversion circuit which minimizes the use of the space and minimizes power consumption.

SUMMARY OF THE INVENTION

In a telecommunications switching system, a bi-polar hybrid conversion circuit is connected to a digital span via a transformer and to switching network, which is CPU controlled. This hybrid converts data from the coding scheme of digital span to another coding scheme suitable for use with the logic of switching networks.

This conversion circuit includes impedance control which is connected to the CPU and operates to switch the input impedance of the conversion circuit to a relatively high input impedance or to a relatively low input impedance for operating the conversion circuit in the active or standby states. A voltage detector is connected to the transformer and the impedance control. The voltage detector operates to produce a signal representing the peak amplitude of the digital span encoded data.

A voltage divider is connected to the voltage detector and operates in response to the peak amplitude signal to produce a signal which represents approximately one-half of the amplitude of the peak amplitude signal.

A comparator is connected to the transformer and the voltage divider. The comparator operates to translate digital span data which is greater in amplitude than the signal representing approximately one-half of the peak amplitude to a data signal compatible with the switching network.

BRIEF DESCRIPTION OF THE DRAWING

FIG. 2 is a block diagram of the conversion circuit receiver hybrid and associated transformer in duplicated configuration.

FIGS. 3A, 3B and 3C are a series of waveform diagrams depicting the conversion process.

DESCRIPTION OF THE PREFERRED EMBODIMENT

Figure 1:
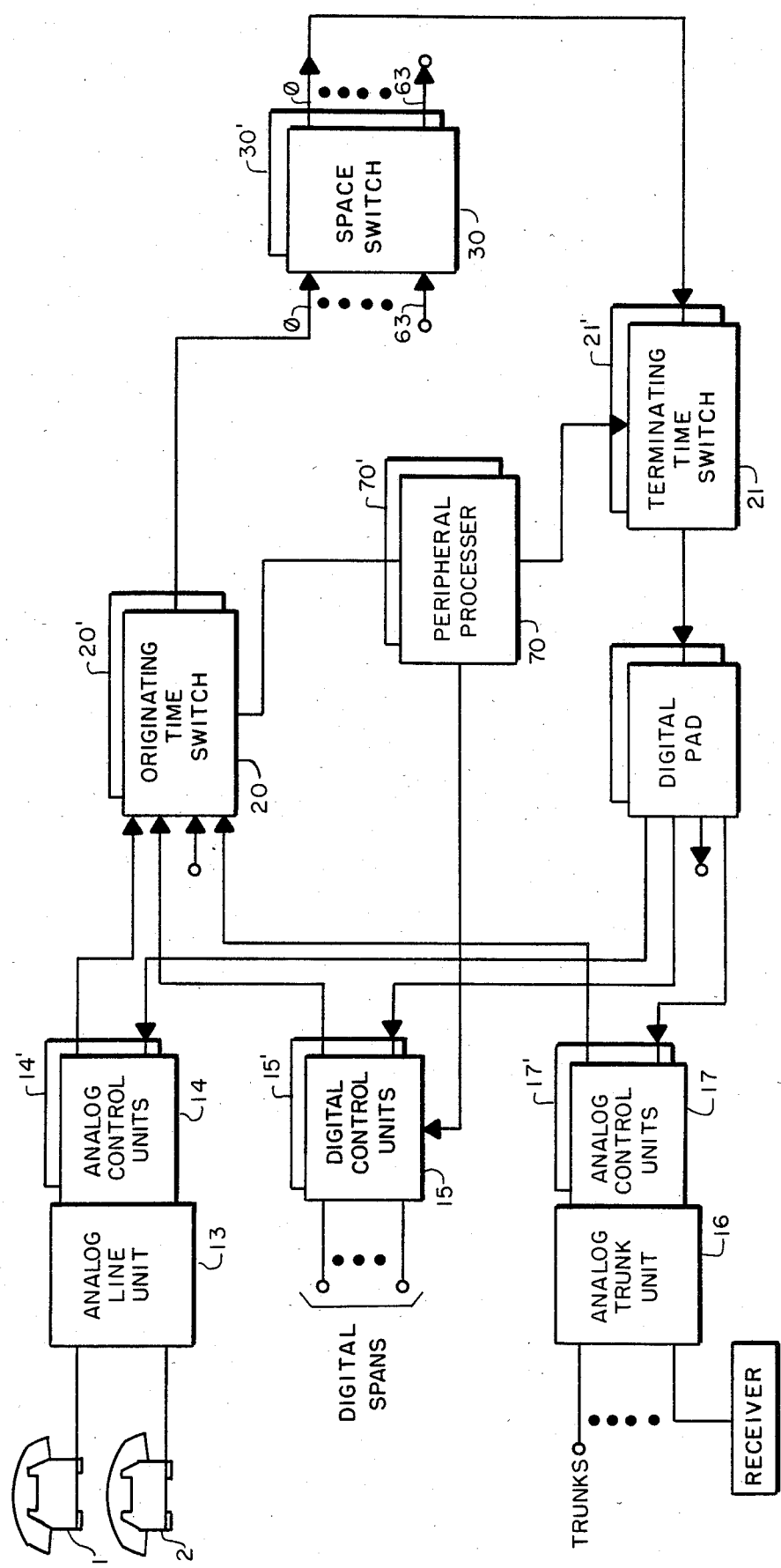
FIG. 1 is a block diagram of a telecommunications switch system embodying the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using a model 9004 T1 digital span manufactured by GTE Lenkurt Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Referring to FIG. 2, conversion circuit receiver hybrid copy 0 and copy 1 are located in digital control units (DCUs) 15 and 15', respectively. These conversion circuit hybrids provide a duplex link between each digital span, which employs the DS1 signaling mode, and the switching network, which uses TTL compatible logic levels.

Each duplex pair of DCUs may handle up to 8 digital spans. A DCU may handle all 8 digital spans for a fault condition in the other DCU of the duplex pair. The switching office may contain many DCU pairs.

It is to be noted that although the circuitry set forth herein is described using the DS1 formats for use with T1 spans, signaling formats DS2 and DS3 for use with T2 and T1C spans, respectively, may also be processed by the circuitry with only minimal changes in the peripheral processor to software.

Each conversion circuit hybrid receiver, copy 0 and copy 1, is connected to a particular digital span via transformers T0 and T1, respectively. Each conversion circuit is a thick film hybrid.

FIG. 3A shows a typical input waveform that would appear at the input of the transformer. FIG. 3B shows the waveforms which would appear at the transformer outputs (+I and −I) for this same typical input waveform that was shown in FIG. 3A. FIG. 3C shows the output produced by the conversion circuit receiver hybrid. Every pulse at the input causes a pulse of the same width at the output. It is important that the width of the output pulse be about the same as that of the input.

Input pulses which are less than one-half the amplitude of the peak input pulse level should be treated as noise and cause no output disturbance, whereas input pulses which are greater than one-half the normal peak input pulse level should be treated as true pulses and should cause a corresponding output pulse.

Figure 4:
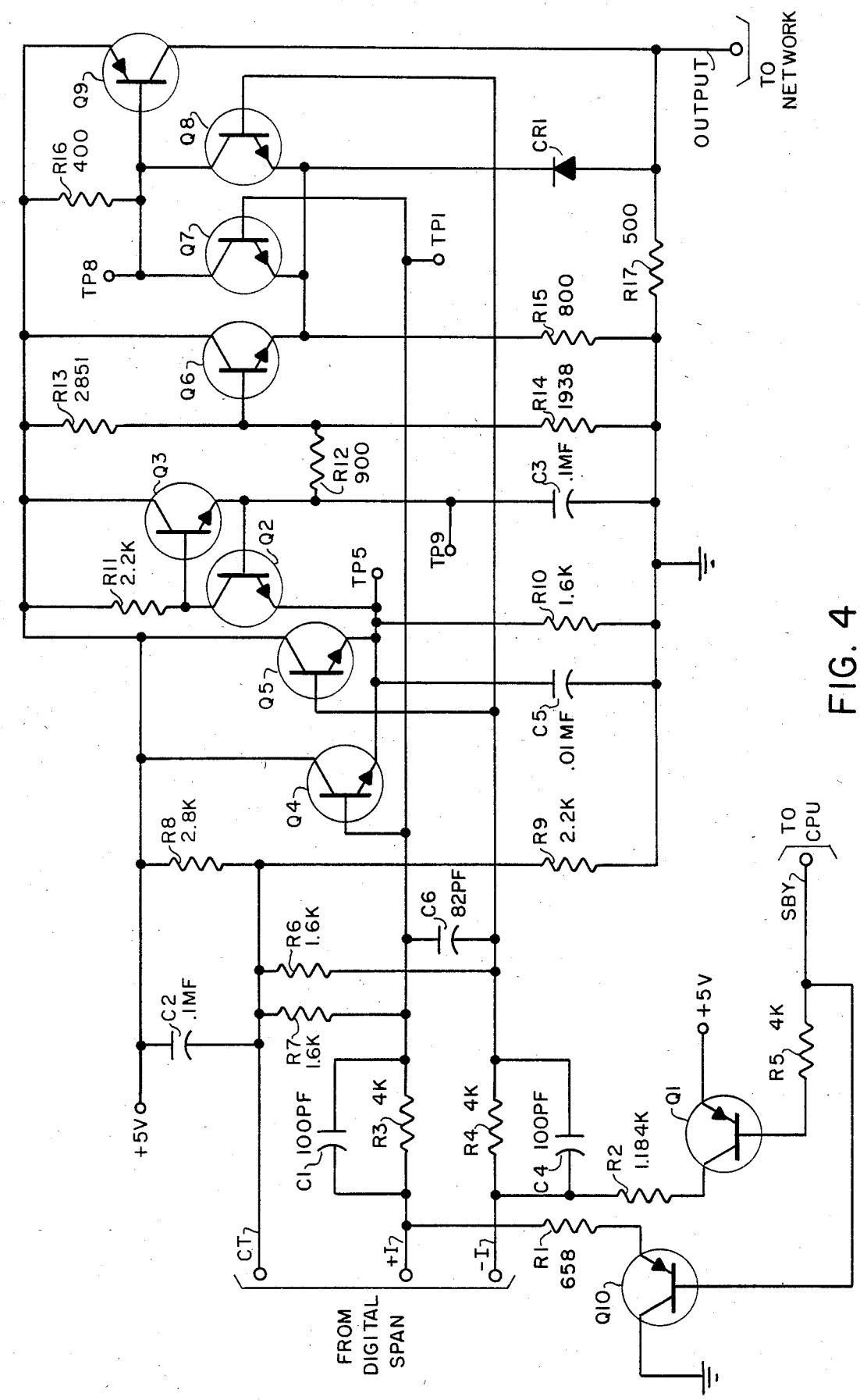
FIG. 4 is a schematic diagram of each conversion circuit receiver hybrid.

Referring to FIG. 4, each copy of the hybrid conversion circuit may be divided into seven functional units as follows:

(1) Input impedance control including resistors R1, R2, R5, and transistors Q1 and Q10. Under control of the SBY lead connected to peripheral processor 70, the input impedance of the hybrid circuit is varied. When SBY is high, the input impedance is about 3K ohms; when SBY is low, the input impedance is about 600 ohms.

(2) A compensation network includes resistors R3, R4, R5, R7, and capacitors C1, C4, and C6. This network attenuates the input signals on the +I and −I leads, so that the peak detector and comparator inputs are not overdriven.

(3) A bias network includes resistors of R8 and R9, and capacitor C2. These components establish a DC operating point for the circuit of about 2.2 volts.

(4) The peak voltage detector includes resistors R10 and R11, capacitors C3 and C5, and transistors Q2, Q3, Q4, and Q5. This circuit measures the peak voltage which appears at the input leads +I and −I (after the signals have been attenuated by the compensation network). This peak voltage is then used to set the threshold point for the comparator stage. The peak voltage appears at TP9.

(5) A threshold voltage divider includes resistors R12, R13, and R14. This network takes the peak voltage developed and divides it by two.

(6) The comparator circuit includes resistors R15 and R16, and transistors Q6, Q7, and Q8. This circuit compares each of the inputs on leads +I and −I (after they have been attenuated) with the threshold voltage (one-half of the peak input voltage). If either of the inputs exceeds the threshold voltage, the comparator will sink current through the base of transistor Q9, causing its output to go high. If both inputs are below the threshold voltage, the output stage transistor Q9 will be turned off.

(7) Output stage including resistor R17, diode CR1, and transistor Q9. This circuit responds to the comparator output, generating a TTL compatible voltage level at the output lead.

The input impedance control operates in the following manner. When the SBY lead is set high by peripheral processor 70, transistors Q1 and Q10 are both turned off, preventing current from flowing through either resistor R1 or R2. In this case the input impedance is primarily determined by the series combination of resistors R5 and R7 which is 3.2K ohms.

When the peripheral processor 70 sets the SBY lead low, both transistors Q1 and Q10 are turned on. Transistor Q1 provides a low impedance path between resistor R2 and +5 volts, while transistor Q10 provides a low impedance path between resistor R1 and ground. In this case, it appears that the series combination of resistors R1 and R2 is placed in parallel across the input leads +I and −I, reducing the input impedance to about 600 ohms.

The compensation network functions as follows. Resistors R3 and R7 form a voltage divider for the signal at input lead +I, while resistors R4 and R5 form a voltage divider for the signal at input lead −I. These dividers reduce the input voltage to about 0.25 the value which appears at the +I and −I leads. The capacitors C1, C4, and C6 form a capacitive voltage divider. These values were chosen in combination with the Miller capacitance of the transistors Q4, Q5, Q7, and Q8 and the values of resistors R3, R4, R5, and R7. As a result, the input waveform at +I and −I leads will be attenuated, but not significantly distorted. Without these capacitors, the Miller capacitance at the inputs of these transistors causes the attenuator output to be greatly distorted and the circuit functions improperly.

The bias generator is a voltage divider formed by resistors R8 and R9. The capacitor C2 filters the bias voltage to reduce any undesired noise. The values of resistors R8 and R9 have been chosen so that the bias voltage present at their junction will be approximately 2.2 volts.

The peak voltage detector operates in the following manner. The peak voltage itself is developed across capacitor C3 and appears at TP9. This peak voltage is present at the base of transistor Q2 and sets the bias at TP5 to be the peak voltage minus the base-emitter drop of transistor Q2. If either input +I or −I (after attenuation) exceeds the peak voltage, then transistors Q4 or Q5 will begin to conduct. This will increase the voltage at TP5, turning off transistor Q2. When transistor Q2 is turned off, current flows through resistor R11 into the base of transistor Q3, turning on transistor Q3. Transistor Q3 then increases the charge on capacitor C3 until the voltage at the base of transistor Q2 slightly exceeds the input voltage at the base of either transistor Q4 or Q5. This causes transistors Q4 and Q5 to stop conducting. With transistor Q2 conducting once more, the current which was flowing through the base of transistor Q3 is now conducted back through transistor Q2. This turns transistor Q3 off and stops the charging of capacitor C3. The net result is that capacitor C3 has now been charged up to a value, which is equal to the new peak value present at the input.

The threshold voltage is determined by resistors R12 through R14 in the following manner. Resistor R12 together with the parallel combination of resistors R13 and R14 form a voltage divider. These resistors are trimmed so that one-half of any voltage change appearing at the peak voltage detector output TP9 will occur at the base of transistor Q6. As the input signal level changes, the threshold voltage changes proportionally, always remaining at one-half the value of the peak input signal level.

The comparator and output stages function as follows. In case 1, the input voltage at the base of transistors Q7 and Q8 is less than the threshold voltage at the base of transitor Q6. Therefore, current flows through transistor Q6, keeping the voltage at the emitters of transistors Q7 and Q8 equal to the threshold voltage minus the base-emitter drop of transistor Q6. Since the voltage at the base of transistors Q7 and Q8 is less than the threshold voltage, neither transistors Q7 nor Q8 will conduct. This allows resistor R16 to pull up the voltage at TP8 to +5 volts. As a result, transistor Q9 will not conduct, causing resistor R17 to pull the output down to ground.

Now for case 2, when the input voltage at the base of transistors Q7 or Q8 exceeds the threshold voltage, transistors Q7 or Q8 will begin to conduct. Either of transistors Q7 or Q8 which is conducting will draw current through the base of the output transistor Q9, turning on transistor Q9. Transistor Q9 will source current, causing the output voltage to increase to a logic "1" level. When the output exceeds the voltage at TP1, diode CR1 will begin to conduct, increasing the voltage at TP1. As this voltage increases, the amount of current conducted by transistors Q7 or Q8 will decrease, reducing the base drive current through transistor Q9 and preventing the output voltage from rising any further. In effect this provides a negative feedback path which clamps the output voltage, preventing transistor Q9 from becoming saturated. This is important because should transistor Q9 become saturated, its turn off time greatly increases. As a result, transistor Q9 would be unable to respond to rapid changes in the input signal.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system having a CPU, a conversion circuit being connected to a digital span via a transformer and to a switching network of said switching system for converting data of a first coding to data of a second coding, said conversion circuit comprising:
   impedance control means connected to said CPU and operated in response to a first signal of said CPU to select a first impedance value of said circuit for a first value of said first signal or alternatively to select a second impedance value of said circuit for a second value of said first signal;
   voltage detection means connected to said transformer and to said impedance control means, said voltage detection means being operated in response to said data of said first coding to produce a second signal representing a peak amplitude of said data of said first coding;
   voltage divider means connected to said voltage detection means and operated in response to said second signal to produce a third signal representing approximately one-half the amplitude of said second signal; and
   comparator means connected to said transformer and to said voltage divider means, said comparator means being operated in response to said data of said first coding and to said third signal to produce an output signal for said data of said first coding having an amplitude in excess of said amplitude of said third signal, said output signal being said data of said second coding compatible with said switching network.

2. A conversion circuit as claimed in claim 1, wherein said conversion circuit further includes compensation network means connected to said digital span via said transformer for attenuating said data of said first coding to prevent overdrive of said voltage direction means and said comparator means.

3. A conversion circuit as claimed in claim 2, wherein said conversion circuit further includes bias network means connected between said compensation network means and said voltage detection means, said bias network means operated to establish a D.C. operating voltage for said compensation circuit.

4. A conversion circuit as claimed in claim 3, wherein said conversion circuit further includes output means connected between said comparator means and said switching network, said output means operated in response to said comparator means to produce said output signal of said second coding.

5. A conversion circuit as claimed in claim 4, said impedance control means including:
   said transformer providing three input signals, a positive input signal, a negative input signal and a center tap signal via three corresponding input leads;
   first current control means connected to said CPU and to said transformer via said negative input lead; and
   second current control means connected between said CPU and to said transformer via said positive input lead.

6. A conversion circuit as claimed in claim 5, said voltage detection means including:
   third current control means connected to said transformer via said positive input lead and to said compensation network means;
   fourth current control means connected to said transformer via said negative input lead and to said compensation network means;
   fifth current control means connected to said third and said fourth current control means; and
   sixth current control means connected to said fifth current control means and to said voltage divider means.

7. A conversion circuit as claimed in claim 6, said voltage divider means including a resistive network connected between said fifth and sixth current control means and said comparator means.

8. A conversion circuit as claimed in claim 7, said voltage detection means further including a first capacitor connected to said fifth and sixth current control means and to said resistive network.

9. A conversion circuit as claimed in claim 8, said comparator means comprising:
   seventh current control means connected to said resistive network;
   eighth current control means connected between said seventh current control means and said output means, said eighth current control means further connected to said transformer via said positive input lead and said negative input lead.

10. A conversion circuit as claimed in claim 9, said eighth current control means including:
    first transistor means having a base, emitter and collector inputs connected to said seventh current control means and being connected to said transformer via said positive input lead and connected to said compensation network means via said base input; and
    second transistor means having a base-emitter and collector inputs and being connected via said base input to said transformer via said negative input lead and being connected to said compensation network means, said first and second transistor means being further connected to each other at their collector inputs and at their emitter inputs.

11. A conversion circuit as claimed in claim 10, said compensation network means including:
    first resistor-capacitor network connected between said transformer via said positive input lead and said third current control means and said first transistor means;
    second resistor-capacitor network connected between said transformer via said negtive input lead and said fourth current control means and said second transistor means;
    a second capacitor connected between said positive input lead and said negative input lead of said transformer;

a first resistor connected between said center tap lead and said positive input lead of said transformer; and a second resistor connected between said center tap lead and said negative input lead of said transformer.

12. A conversion circuit as claimed in claim 11, said biased network means including a series connection of third and fourth resistors having a common connection of said series connection connected to said transformer via said center tap lead, said third and fourth resistors being connected to each of said current control means.

13. A conversion circuit as claimed in claim 12, said output means including:

third transistor means having base, emitter and collector inputs, said base input connected to said first and second transistor means and providing said output signal at the collector of said third transistor means; and diode means including a diode having an anode and a cathode, said anode connected to said emitter inputs of said first and second transistor means, said cathode connected to said collector input of said third transistor means, said diode means operated in response to said data of said second coding to provide a rapid transition of said output signal from a logic "1" state to a logic "0" state.

14. A conversion circuit as claimed in claim 1, wherein said conversion circuit is a thick film hybrid.

* * * * *